US007350046B2

(12) United States Patent
Sicola et al.

(10) Patent No.: US 7,350,046 B2
(45) Date of Patent: Mar. 25, 2008

(54) MANAGED RELIABILITY STORAGE SYSTEM AND METHOD MONITORING STORAGE CONDITIONS

(75) Inventors: Stephen J. Sicola, Monument, CO (US); Charles M. Sander, Niwot, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 520 days.

(21) Appl. No.: 10/817,617

(22) Filed: Apr. 2, 2004

(65) Prior Publication Data

US 2005/0240792 A1    Oct. 27, 2005

(51) Int. Cl.
*G06F 12/06* (2006.01)
(52) U.S. Cl. .................. 711/170; 711/163; 711/111
(58) Field of Classification Search ............. 711/154, 711/170, 133, 118, 136, 163, 111; 714/47, 714/57, 37; 702/182, 186
See application file for complete search history.

(56) References Cited

U.S. PATENT DOCUMENTS

| | | | | |
|---|---|---|---|---|
| 5,206,497 | A | * 4/1993 | Lee ......................... | 250/201.1 |
| 5,572,672 | A | * 11/1996 | Dewitt et al. ................. | 714/47 |
| 5,678,042 | A | 10/1997 | Pisello et al. | |
| 5,802,069 | A | 9/1998 | Coulson | |
| 5,944,839 | A | 8/1999 | Isenberg | |
| 6,018,432 | A | 1/2000 | Ukani | |
| 6,073,105 | A | * 6/2000 | Sutcliffe et al. ............... | 705/1 |
| 6,249,890 | B1 | 6/2001 | Ukani et al. | |
| 6,279,108 | B1 | 8/2001 | Squires et al. | |
| 6,332,178 | B1 | * 12/2001 | Dean et al. ................. | 711/118 |
| 6,374,367 | B1 | * 4/2002 | Dean et al. ................... | 714/37 |
| 6,542,978 | B2 | * 4/2003 | Goldstein et al. .......... | 711/170 |
| 6,629,201 | B2 | 9/2003 | Dempsey et al. | |
| 6,680,806 | B2 | 1/2004 | Smith | |

(Continued)

FOREIGN PATENT DOCUMENTS

EP      1357464 A2    10/2003

OTHER PUBLICATIONS

"Performance Monitor of Small Remote Computer Systems", IBM TDB, vol. 19, No. 6, Nov. 1976, pp. 2386-2388.*

(Continued)

*Primary Examiner*—Pierre-Michel Bataille
(74) *Attorney, Agent, or Firm*—David K. Lucente; Derek J. Berger

(57) ABSTRACT

Disclosed is a managed reliability storage system and method. A data storage system comprises a plurality of storage devices and at least one storage device controller and may also include additional storage device controllers, one or more host systems, and one or more network connections. Aspects of the invention include reliable data storage formats, planned reliability management, threshold reliability management, and software data recovery. Reliable data formats include fault tolerant storage formats such as RAID and implementations thereof. Planned reliability management includes monitoring of system usage and adjustment of usage reflecting an optimal usage model, scheduled and event driven diagnostic execution and conditional adjustment of operating parameters of storage system components. Software data recovery provides copying and reconstruction of data through redundant data formats including parity, ECC, RLL and others encoding methods. Embodiments of the invention provide an opportunity for increased storage system reliability through scheduled or event driven "tune ups" of system usage and of system components, including low level manufacturing parameters, reducing long term storage costs.

29 Claims, 3 Drawing Sheets

U.S. PATENT DOCUMENTS

| | | |
|---|---|---|
| 6,708,175 B2 | 3/2004 | Curran et al. |
| 6,744,578 B1 | 6/2004 | Bishop |
| 6,766,416 B2 | 7/2004 | Bachmat |
| 6,782,455 B2 | 8/2004 | Palanca et al. |
| 6,789,132 B2 | 9/2004 | Hoskins |
| 6,880,110 B2 | 4/2005 | Largman et al. |
| 6,883,066 B2 | 4/2005 | Herbst et al. |
| 2001/0056362 A1* | 12/2001 | Hanagan et al. ............... 705/7 |
| 2002/0091722 A1 | 7/2002 | Gupta et al. |
| 2003/0101109 A1 | 5/2003 | Kaneda et al. |
| 2003/0188092 A1 | 10/2003 | Heath et al. |
| 2003/0219033 A1 | 11/2003 | Silvester |
| 2004/0193827 A1 | 9/2004 | Mogi et al. |
| 2004/0215912 A1 | 10/2004 | Vergis et al. |
| 2005/0033625 A1 | 2/2005 | Kline |

OTHER PUBLICATIONS

"Memory Usage Estimator", IBM TDB, vol. 16, No. 1, Jun. 1973, pp. 284-285.*

"Structure of Performance Monitor for Distributed Computer Systems", IBM TDB, vol. 20, No. 11B, Apr. 1978, pp. 5060-5065.*

"Memory Utilization Monitor", IBM TDB, vol. 15, No. 5, Oct. 1972, pp. 1709-1712.*

"Monitoring Distributed Embedded Systems" by Ray Ford, 1990 pp. 237-244.*

* cited by examiner

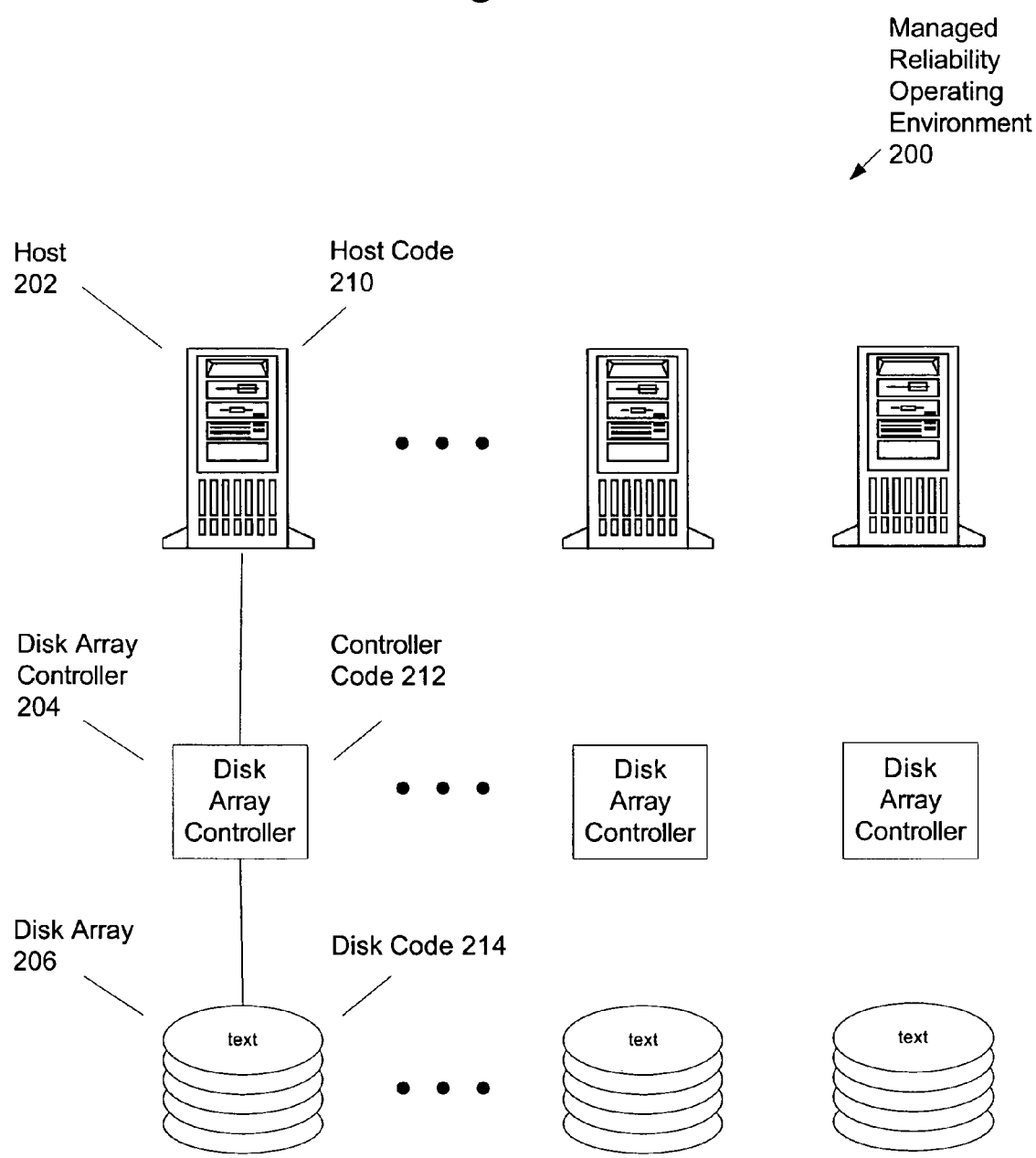

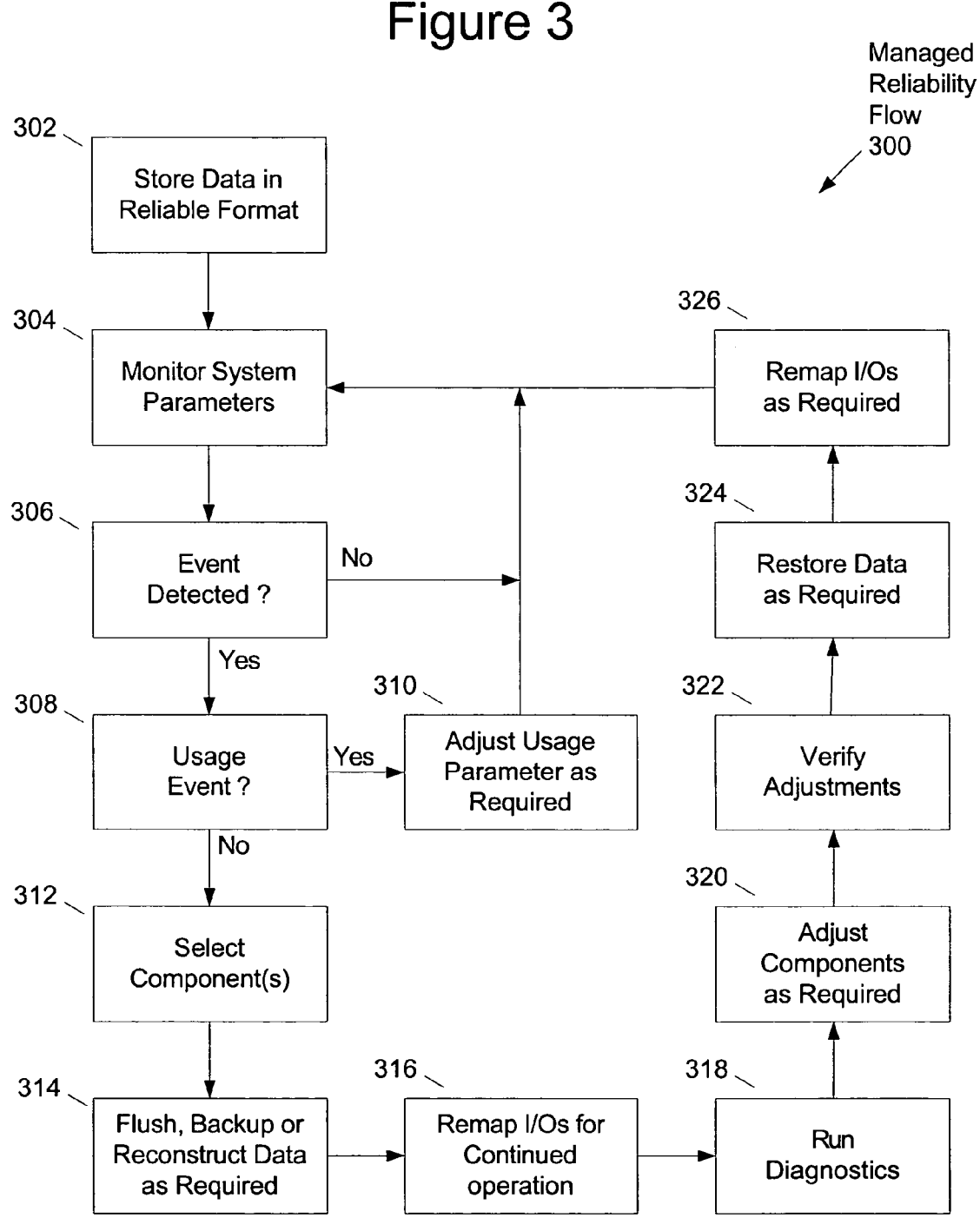

MANAGED RELIABILITY STORAGE SYSTEM AND METHOD MONITORING STORAGE CONDITIONS

BACKGROUND OF THE INVENTION a. Field of the Invention

The present invention pertains generally to data storage and more specifically to a system and method of active reliability management for data storage systems.

b. Description of the Background

Data storage systems can comprise an array of disc drives connected to one or more disc array controllers using one or more buses. Disc array controllers may be connected to one or more host systems using one or more buses. Data storage formats, such as RAID (Redundant Array of Independent Discs), may be employed to distribute user data and redundant information across multiple drives such that if a drive fails, user data may be copied, regenerated, or reconstructed (regenerated and copied to another drive) from remaining operating drives. Systems may also employ redundant controllers and/or buses such that if a connection path or controller fails, another path or controller may be available to transfer data and commands.

The ability of a data storage system to operate for long periods of time without failure reflects the number and quality of components and directly affects the value and marketability of the system. Selection of components with very long MTBF (mean time between failure) ratings can increase probable operating life of a storage system, but usually at increased cost. Higher levels of redundancy, such as additional spare controllers, buses, and/or storage devices may also result in higher system cost.

While systems with high levels of redundancy may be repaired without loss of data, throughput and data availability may be limited until failed components are replaced. Scheduled replacement of components at times of low system utilization may increase data availability during times of high demand, but at the additional cost of parts and labor. This may also result in higher component operating costs since some components that would otherwise continue to function may be replaced.

Present storage system management methods are reactive in nature, such as suggesting replacement of drives with error rates above a predefined threshold, for example. This method is problematic in that a threshold set too low fails to identify components prior to failure whereas a threshold set too high results in unnecessary replacement of components incurring additional cost and downtime.

SUMMARY OF THE INVENTION

Embodiments of the present invention provide a system and methods of actively managing storage system operation and storage system components and adjusting system and component operating parameters to extend the operating life of the storage system. Managing of storage system components includes monitoring operational characteristics of the system and determination if adjustment of operating parameters of the system and of one or more components should be performed. Adjustment of system operating parameters may include adjusting cache sizes, scheduling of read and write operations, and component utilization rates. System operating parameter and component adjustment may take place on a scheduled basis or may be event driven and take place in response to a change in a monitored parameter or to user input.

Embodiments of the present invention therefore can comprise a method of operating a data storage system comprising: monitoring operation of the data storage system; acquiring at least one parameter of the data storage system operation; accessing an optimal usage model for the data storage system that reflects at least one component in the data storage system; comparing the at least one parameter acquired by monitoring operation of the data storage system with a predetermined value contained in the optimal usage model; and adjusting usage of the data storage system if the at least one parameter is greater than or equal to the predetermined value.

Embodiments of the present invention can further comprise a method of managing a data storage system comprising: determining if an adjustment event has occurred; identifying at least one storage system component; placing the at least one data storage system component in a condition for diagnostic testing; executing diagnostic computer program code that tests the at least one data storage system component; acquiring at least one data storage component parameter from the diagnostic computer program code; and adjusting the at least one data storage system component if the at least one data storage component parameter is greater than or equal to a predetermined value.

Embodiments of the present invention therefore can comprise a data storage system comprising: a host system; a storage controller; a plurality of data storage devices; a model of optimal usage for at least one data storage system component; computer program code that acquires at least one operating parameter for the at least one data storage system component and that compares the at least one operating parameter with a predetermined value contained in the model of optimal usage and that adjusts usage of the data storage system if the at least one operating parameter is greater than or equal to the predetermined value.

Embodiments of the present invention therefore can comprise a data storage system comprising: a host system; a storage controller; a plurality of data storage devices; scheduling computer program code that determines if at least one scheduling condition is met and initiates execution of diagnostic computer program code if the at least one scheduling condition is met; event detection computer program code that determines if at least one initiating event has occurred and that initiates execution of the diagnostic computer program code if the at least one initiating event has occurred; and computer program code that compares at least one component parameter value acquired by the diagnostic computer program code with a predetermined value and that performs an adjustment of a storage system component if the at least one component parameter is greater than or equal to the predetermined value.

BRIEF DESCRIPTION OF THE DRAWINGS

In the drawings,

FIG. 2 depicts a managed reliability system environment.

FIG. 3 is a flow diagram of a managed reliability implementation.

DETAILED DESCRIPTION OF THE INVENTION

Figure 1:
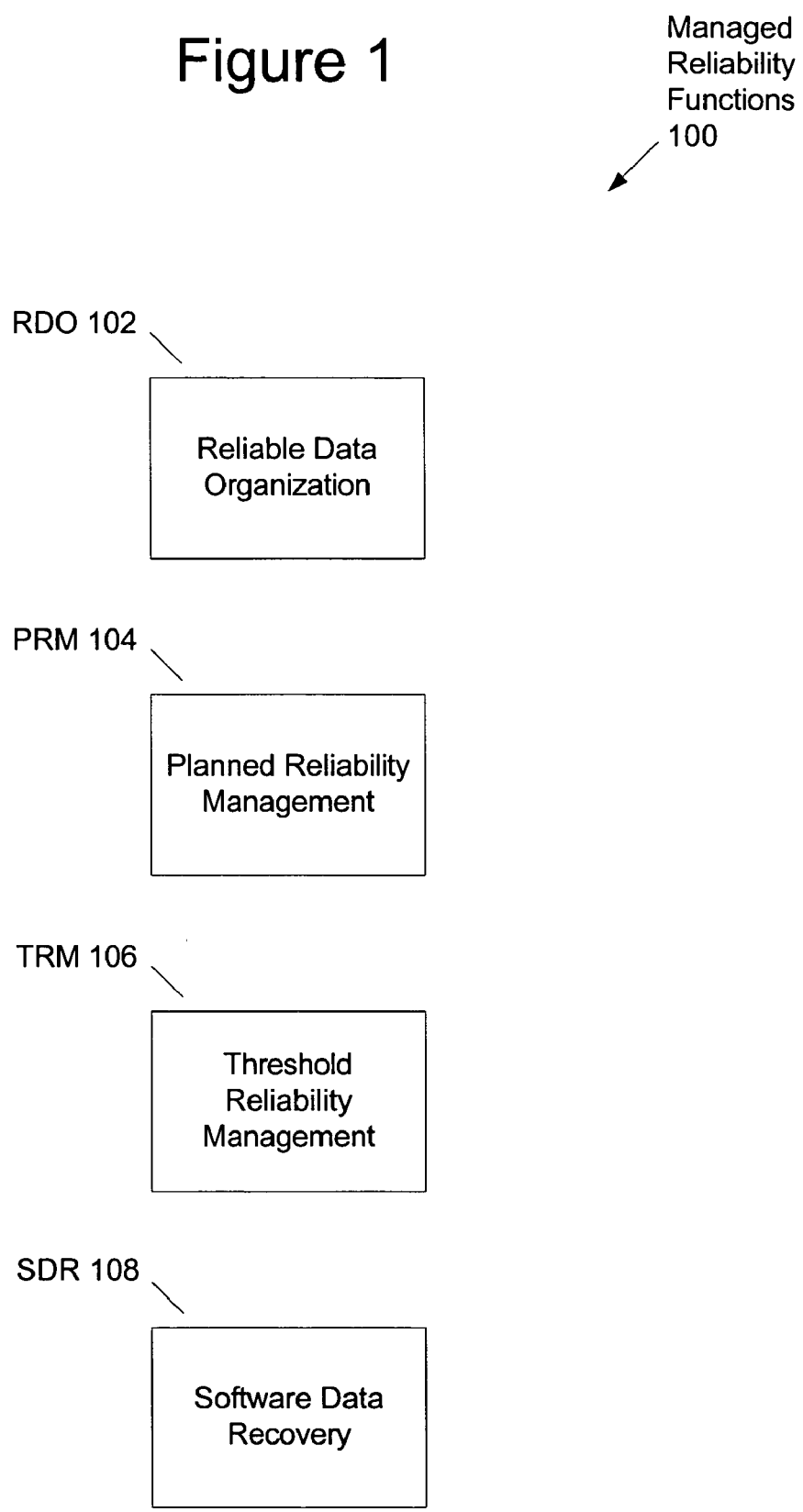
FIG. 1 is a block diagram of managed reliability components.

Managed reliability is a system and method of providing long term reliable data storage in a data storage system at reduced cost by extending the reliable operating life of system components. Managed reliability is applicable to a wide range of storage systems ranging from personal computers to large storage arrays.

Embodiments of the present invention may provide increased reliable operating life for data storage systems by utilizing system components in a manner consistent with component characteristics, capabilities and limitations, and through periodic or event driven adjustment of system operating parameters and periodic or event driven diagnostic testing and adjustment of storage system components. The system may be monitored on a periodic, event driven, or continuous basis to determine how system components are being utilized and to determine the operating condition of system components. Monitoring and adjustment functions may be implemented in one or more locations within a storage system, including disc drive electronics, disc array controllers, host systems, network portals/monitoring systems, and remote systems, for example. Operation may be fully automatic and unobserved by users, or may comprise user interfaces that show storage system status and actions performed or planned. Management and adjustment operations may take place in a transparent manner and may be scheduled to utilize periods of lower component or system utilization or may be interspersed with data access operations. Spare storage capacity of a data storage system may be employed such that components may be taken off-line for diagnostic testing.

Adjustable parameters include disc drive parameters and may include bus and controller configuration including signal amplitude, disc format, data mapping, read/write buffer allocation, packet size, offset, and the like. Embodiments of the present invention advantageously include adjustment of disc drive parameters established during the manufacturing process, providing much greater control than in other systems or methods. Adjusted disc drive parameters encompass both reliability extension, and fault tolerant recovery in sub-devices within a disc or storage device itself Managed reliability comprises a plurality of functions that organize data in a fault tolerant manner, that provide monitoring and analysis of system and component operation for schedule and event driven component adjustment, and that provide data recovery and reconstruction methods in the event of a component failure. FIG. 1 is a block diagram of managed reliability functions. Functions 100 comprise reliable data organization (RDO) 102, planned reliability management (PRM) 104, threshold reliability management (TRM) 106, and software data regeneration and reconstruction (SDR) 108. RDO 102 comprises storing data in the storage system is fault tolerant data storage formats and can include RAID and any other encoding methods, such as ECC and Reed Solomon, for example, or any combination thereof. A plurality of differing formats, such as various RAID levels or other fault tolerant encoding methods, may be supported concurrently.

Planned reliability management 104 comprises scheduled monitoring and diagnostic procedures that may be employed to configure system operation and/or to adjust data storage components. An optimal usage model is provided for at least one data storage system component. Various models may be provided for different data storage system components and different versions of the components. The optimal usage model defines usage parameters that may result in greater longevity of components, reduced likelihood of failure (reliability), and/or optimization of performance. Parameters may comprise write cache size, read cache size, maximum continuous access duration, average utilization factor, actuator acceleration, and other parameters. Disc drives tend to operate more efficiently when pluralities of I/O operations are queued within the drives. For example, drives often employ "elevator sort" algorithms that select an order of execution of pending I/Os corresponding to physical locations on the media that reduces head movement. This reduces average access time and also results in less wear to head positioning (actuator) mechanisms. Caching of I/O requests prior to issuance to drives can result in reduced head thrashing. The size of read and write caches may be adjusted to reduce actuator activity. This may be performed on a scheduled basis and may reflect the type or types of data being accessed. For example, streaming video data may comprise large contiguous data blocks whereas billing information may comprise a large number of smaller files distributed across the storage media. Another optimal usage model parameter may be maximum continuous access time. Drive heads produce heat during read and write operations. Managing heat buildup may result in greater drive longevity and reliability. Large files, such as the aforementioned streaming video data may be distributed across a plurality of drives to limit the duration of access for any one drive. Average utilization factors may be employed to balance access rates among a plurality of drives. Planned reliability management may further comprise sorting I/Os into real-time and non real-time accesses. For example, streaming video is likely a real-time or near real-time activity whereas billing need not be executed on a real-time basis. Management software may cache billing accesses until a predetermined number of accesses are pending and then issue a plurality of I/O commands to drives, taking advantage of drive elevator sort capabilities. In addition to tailoring system operation employing optimal usage models, planned reliability may include periodic diagnostic checks to determine the condition of system components. Components may be adjusted depending upon condition. Scheduling of diagnostic checks may employ storage system utilization analysis to determine desired times when adjustment of components may be performed. One or more storage system components may be taken offline while diagnostics are performed. This may comprise storing data to another drive or system and remapping I/Os to that drive or system such that the system continues to operate and adjustment or diagnostic tasks are performed in a background manner.

Threshold reliability management 106 comprises diagnostic procedures and system or component adjustment procedures performed in response to an event, such as detection of a fault, error, or failure, or of a usage parameter that is greater than or equal to a predetermined value. Parameters can include optimal usage model parameters or component error conditions, read retry rates, error rates, and the like. Threshold reliability management functions may include or invoke the functions of planned reliability plus may include functions of invocation of functions of software data recovery. Diagnostic and component adjustment procedures are described in greater detail relative to FIGS. 2 and 3. SDR 108 may comprise data copying, regeneration and/or reconstruction of data from failed or poorly performing components and storing data to other functioning components or systems and remapping of data I/Os consistent with the redundant data formats of RDO 102. Data formats may be changed during this process. For example, a RAID-1 data file may be stored as a RAID-5 data file following a component failure. The functions shown in FIG. 1 may be implemented in computer program code operating one or more portions of a data storage system including, for example, interface controllers, disc controllers, and/or hosts.

FIG. 2 depicts a managed reliability system environment. Environment 200 comprises host 202, disc controller 204, and disc array 206. Host 202 is connected to disc controller 204 through one or more bus or network connections such as SCSI, fibre channel, Ethernet, or P1394, for example. Disc controller 204 receives data transfer requests from host 204 and may issue commands to one or more disc drives comprising disc array 206. Data transfer requests encompass data stored on discs in disc array 206, and data that may exist in RAM, EEPROM, or other memory in disc controller 204 and in memory of drives of disc array 206. Interrupts or other signaling formats may be used to transfer status information from discs in disc array 206 to controller 204 and/or from controller 204 to host 202. Computer program code providing managed reliability functions (or portions thereof) of embodiments of the present invention may reside in host 202, disc controller 204, and in disc drives of disc array 206. Various functions performed in implementing embodiments of the present invention may be resident in different portions of environment 200 or may be downloaded to various components as needed. Such downloading may comprise reading computer program code from memory of a disc controller or disc drive, storing the program code, downloading diagnostic or adjustment code, executing the code, obtaining any results or performing an adjustment, checking the adjustment or performing further diagnostics, and then restoring the original program code. Host computer program code 210 operating in host 202 can comprise monitoring, user interface, scheduling, diagnostic, component adjustment and other code. A user interface may provide a system operation overview such as data throughput, latency, error rates, utilization, and the like. The user interface may also provide operator control of scheduling, diagnostic, and component adjustment functions. The user may employ utilization information to select or specify when diagnostic routines are run. The operator may also select one or more diagnostic routines from a suite of diagnostic routines, wherein such selection may reflect trend information such as a detected increase in error rates or latency, for example. Diagnostic routines may be executed as a result of a scheduling condition being met. Scheduling events may comprise a predetermined amount of time having elapsed, a predetermined number of data transfers having been performed, or a system utilization level being less than or equal to a predetermined level, or a combination of conditions, for example. Diagnostic routines may also be executed in response to an error condition or to a monitored parameter meeting or exceeding a predetermined value or as a result of a user input. Diagnostics performed in this manner may be referred to as event driven or threshold based diagnostics. Adjustment functions may be performed in conjunction with diagnostic routines or may be preformed alone. Adjustment functions may be performed in response to a user input, in response to scheduling, or in response to an event.

Referring again to FIG. 2, computer program code 210 operates in host 202, controller program code 212 operates in disc controller 204, and disc program code 214 operates in one or more discs of disc array 206. Various program code components of monitoring, diagnostic, and adjustment functions may be distributed among host 202, disc controller 204, and one or more discs of disc array 206. As noted previously, code may be downloaded from a network to host 202, to controller 204, and/or to one or more discs of disc array 206. Code may be downloaded from host 202 to disc controller 204 and/or to one or more discs of disc array 206. Code may be downloaded from disc controller 204 to one or more discs of disc array 206. Downloading of code may include saving other code from the component to a memory located in the component or elsewhere in the system. Upon completion of diagnostic and adjustment procedures, the code may be reloaded to the component. The system of FIG. 2 may include other programmable components (not depicted), such as interface controllers, for example, that may also contain a portion of the computer program code employed to implement embodiments of the present invention.

FIG. 3 is a flow diagram of a managed reliability implementation. At step 302, data is stored in a storage subsystem. Data storage employs a reliable data organization (RDO) as described relative to FIG. 1, wherein embodiments of the present invention are not limited to a specific format or organization or combination of organizations. Various data storage formats may be employed concurrently within the data storage system, such as RAID-0, RAID-1, and RAID-5 for example, or formats may extend across systems. For example, a data organization may comprise RAID1 format data on two different drives of two data storage subsystems. At step 304 system parameters are acquired and monitored. System parameters may be acquired in a periodic or continuous manner. Monitoring of parameters may include comparison with optimal usage models or other device parameters and thresholds and may include calculation of rates, trends and other representations of system and component activity and condition. Monitoring may employ elements of SMART (Self Monitoring and Reporting Technology). SMART is an industry adopted a standardized specification for failure warnings. SMART is based on monitoring for excessive internal drive errors, such as bit-read errors and track-seek errors. SMART employs a failure-warning algorithm running in a drive's microprocessor that checks whether error rates exceed a threshold value and if such condition exists, a warning is sent over the drive interface to the host CPU. While SMART is a reactive approach to possible drive failure (and problematic in threshold settings), aspects of SMART may be employed in parameters acquired as part of the monitoring functions of embodiments of the present invention. The monitoring functions of the present invention may include continuous or periodic monitoring of system and device parameters, calculation of trends, comparison to optimal usage models, periodic or event driven diagnostics to allow proactive adjustment of system utilization and drive parameters, offering increased reliability and operating life.

At step 306 a determination is made if an event, such as a scheduling condition or a threshold event, has occurred. Scheduling conditions may be based upon a predetermined period of time, a predetermined number of I/Os, or other scheduling condition. Scheduling conditions may employ a combination of factors, such as a predetermined period of time having elapsed, and the occurrence of a utilization factor less than or equal to a predetermined value, for example. Scheduling may employ an "as available" scenario where diagnostics may be performed during periods of reduced system utilization. Scheduling may also include exclusion of times of day or otherwise specified periods such that system diagnostic and adjustment procedures are not performed unless an error condition exists. A threshold event may comprise an error condition, an operating parameter of the storage subsystem or component outside a predetermined value or range, or a user input. Monitoring of the storage system may employ computer program code operating in a host system, disc controller, disc or combination thereof. If no event is detected, processing continues at step 304. If an event is detected, processing continues at step 308. At step 308 a check is performed to determine if the event is a usage event. A usage event may comprise a scheduled adjustment of system operating parameters, or may comprise a system operating parameter being greater than or equal to a predefined value. If step 308 determines that the event is a usage event, the process continues at the 310 where system operating parameters are adjusted. Such adjustments may include changing cache sizes, queuing algorithms, data mapping, or other parameters. For example, in a web server, a particular web page may become popular and a large number of requests for data may be received. Access rates to a drive or set of drives that exceeds desired optimum usage models may generate a usage threshold event. Adjustments performed in step 310 may allocate additional cache to drives storing the web page data, may move or copy (duplicate) portions of the data to other drives, or may reduce the rate at which read requests for the data are serviced. Adjustments may include changing the format of stored data, such as from RAID-5 to RAID-1, for example, to affect read performance. Additionally, less used data may be converted from RAID-1 to RAID-5 to provide additional storage capacity. Procedures may also include "throttling" of read requests to produce a "cooling down" period for drive heads. The adjustments described are exemplary and embodiments of the present invention may employ any adjustments that tailor system operation to that of an optimal usage model. If it is determined in step 308 that the event detected in step 306 is not a usage event, the process continues at step 312.

At step 312, one or more components for which diagnostics are to be run are selected. Such selection may reflect monitored parameters, reported or detected errors, or scheduling wherein various components may be diagnosed at different intervals or may be diagnosed individually in a serial fashion. At step 314, the storage system is placed in a condition for diagnostics to be run on selected components. This may comprise taking the selected component or components offline. Depending on the nature of the diagnostic to be run and the location in the system at which diagnostic computer program code is executed, this may comprise executing any pending I/Os to empty read and/or write buffers, saving buffer data for I/Os that cannot be completed, saving computer program code from interface controller, disc controller, or disc drive electronics, or saving user data from one or more a disc drives. In the event that the user data is not available, possibly due to a read error, for example, data may be copied or regenerated and stored on another drive. Data may be backed up (stored) in a manner consistent with the format or formats employed in step 302. The backup (storing) of data may employ distributing data to other disc drives in a local storage array or storing data in other storage systems. Such storage may also employ conversion of data formats, such as converting RAID1 format data to RAID5 format data, for example. The storing of data allows various tests to be performed that may overwrite data on a disc drive or otherwise may result is data loss. Saving of computer program code data from interface controller, disc controller, or disc drive electronics allows computer program code implementing a portion of a diagnostic or adjustment function to be downloaded to the controller and/or drive and allows original data to be later restored. At step 316, system I/O maps may be updated to allow the system to access data while diagnostics are performed. At step 318, one or more diagnostic functions may be performed. Such diagnostics may include various read and write tests, and may include adjustment of operating parameters such as read channel filtering, gain, servo and tracking feedback, and the like to determine operating condition and margin. Embodiments of the present invention are not limited to a specific type of diagnostic and advantageously may employ diagnostic routines employed during a manufacturing process. At step 320 components may be adjusted. Such adjustment may be performed using information obtained from diagnostics performed in step 318, or may be performed in conjunction with diagnostics to "home in" on a desired value. Diagnostic and adjustment routines may be performed in a hierarchical and/or recursive manner. Embodiments of the present invention are not limited in the types of adjustment performed and may include adjustments employed during a manufacturing process. Adjustments may include remapping of sectors (formatting the drive), adjustment of write voltage or current, adjustment of read amplifier gain, filter coefficients, tracking algorithms, motor speed, and/or actuator acceleration, for example. Adjustment may also include component electronics related adjustments, such as relocating code within device memory (such as SRAM, DRAM or EEPROM), downloading code, reallocating memory, and excluding a portion of memory, for example. The diagnostic functions performed in step 318 may determine that no adjustment is required, such as may be the case for scheduled diagnostics, and as such no adjustments would be performed at step 320. At step 322, adjustments are verified. After an adjustment is performed, a diagnostic may be performed to determine the effect of the adjustment and to determine of further adjustments are to be performed. Relative to a condition detected in step 318, there may be a plurality of adjustment actions that may be employed to remedy the detected condition. Steps 320 and 322 may be recursive in that various adjustments may be performed and verified until a desired result is achieved or until it is determined that the condition cannot be remedied. At step 324, data stored in step 314, if any, is restored. This may comprise copying data from other drives or systems and may comprise conversion between storage formats, such as converting from RAID-5 to RAID-1 for example. At step 326, I/O maps are updated as required. The I/O maps reflect whether detected conditions, if any, were remedied and if data has been restored to drives previously taken offline, or if conditions were not remedied. Alternatively, data stored in step 314 may remain in the stored locations and storage capacity from components selected in step 312 may be re-allocated.

The steps depicted in FIG. 3 may be performed conditionally, in an order other than that shown, or in a recursive or segmented manner. For example, some diagnostic routines may not require that data be backed up. An initial set of diagnostics may be performed and the results of the initial diagnostics may be employed to determine if additional diagnostics are to be run. Component adjustment may employ prioritized adjustment routines. For example, a diagnosed condition may be remedied by one or more adjustments. A first adjustment may be performed and results of the adjustment gathered to determine if a desired level of operation has been achieved. Secondary adjustments may then be performed. Adjustments may be recursive or interrelated such that a first adjustment performed may again be performed after a second adjustment is performed.

In some embodiments, diagnostic and/or adjustment computer program code may be considered proprietary, secret, or otherwise confidential. Such code or portions thereof may be resident (in machine format or in encrypted form) in an interface controller, disc controller, or storage array device, or may be accessed across a network employing encryption and then may be decrypted in memory of host computer, interface controller, disc controller, or disc drive prior to execution. Portions of code providing diagnostic and adjustment functions may execute at a remote site. As such, embodiments of the present invention may be provided as a proprietary service.

Embodiments of the present invention provide scheduled or event driven diagnosis and adjustment of storage system and component operating parameters, and may include low level adjustment associated with a manufacturing process. Optimizing operating parameters of the storage system may provide increased operating life and reduced likelihood of data loss. Trend information from diagnostic and adjustment routines may be employed to further estimate likelihood of failure of a storage system component and recommendation if the component should remain in service or should be replaced. The use of low level diagnostics and adjustment may provide greater accuracy in determining likelihood of failure of components than is provided by SMART and similar monitoring methods.

Diagnostics and adjustments may be component specific or may be system specific. Adjustments may reflect operation of a single component, such as a disc drive, for example, or may reflect interaction of a plurality of components, such as actuator acceleration rates of disc drives creating possible vibration and tracking errors. For example, embodiments of the present invention may be employed, such as varying acceleration rates of actuators, to determine that one or more components are loose within a fixture. Other adjustments that reflect the interaction of a plurality of components may include packet size or offset, for example.

The optimal usage models of embodiments of the present invention comprise a plurality of operating parameters that define modes of operation that are conducive to extended device operating life and to reducing the likelihood of sudden failure. The models vary depending on the type of device. For example, disc drives may range from desktop versions to enterprise versions where enterprise versions may be more robust and better suited to high utilization rates whereas desktop versions may be suited to lower access rates and single threaded access. Models may be provided for any type of storage system device and multiple models may be employed in the active reliability management of one system. While the foregoing description has employed disc drives to illustrate the nature of embodiments of the present invention, embodiments of the present invention can be applicable to any storage system having adjustable components.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method comprising steps of monitoring for an occurrence of an event associated with operation of a distributed data storage system, characterizing the event as a usage event related to a usage rare of said system or a non-usage event not related to a usage rate of said system, adjusting a parameter of the data storage system when the event is characterized as a usage event, and executing a diagnostic routine when the event is characterized as a non-usage event.

2. The method of claim 1, wherein the event is characterized as a scheduling condition associated with an elapsed period of time irrespective of usage rate of said system over said elapsed period of time, and wherein the scheduling condition is characterized by the characterizing step as a non-usage event.

3. The method of claim 1, wherein the event is characterized as a scheduling condition associated with completion of a predetermined number of I/O data accesses by said system, and wherein the scheduling condition is characterized by the characterizing step as a usage event.

4. The method of claim 1, wherein the event is characterized as a threshold event wherein an operating parameter has a value outside a predetermined threshold range, and wherein the scheduling condition is characterized by the characterizing step as a usage event.

5. The method of claim 1, wherein the event is characterized as a threshold event wherein an operating parameter has a value outside a predetermined threshold range, and wherein the scheduling condition is characterized by the characterizing step as a non-usage event.

6. The method of claim 1, wherein the parameter adjusted during the adjusting step comprises an available amount of write cache memory for storing data to be written to storage media of said system.

7. The method of claim 1, wherein the parameter adjusted during the adjusting step comprises an operational level of a disc array of said system.

8. The method of claim 1, further comprising a step of copying a content of a first memory location to a second memory location in said system prior to the executing step.

9. The method of claim 8, wherein the content of the first memory location comprises user data arranged in a first format, and wherein the copying step further comprises arranging said user data in a different second format in the second memory location.

10. The method of claim 8 wherein the content of the first memory location comprises the diagnostic routine executed during the executing step.

11. The method of claim 1, further comprising a step of performing a component adjustment in said system in response to a result obtained during the executing step.

12. The method of claim 11, wherein the performing and executing steps are sequentially repeated to arrive at a final component adjustment in said system.

13. The method of claim 1, further comprising steps of copying a content of a first memory location to a second memory location in said system prior to the executing step, and restoring the content to the first memory location after the executing step.

14. A distributed data storage system comprising at least one processor having associated programming to monitor for an occurrence of an event associated with operation of said system, to characterize the event as a usage event related to a usage rate of said system or a non-usage event not related to a usage rate of said system, to adjust a parameter of the data storage system when the event is characterized as a usage event, and to execute a diagnostic routine when the event is characterized as a non-usage event.

15. The system of claim 14 wherein the event is characterized as a scheduling condition associated with an elapsed period of time irrespective of usage rate of said system over said elapsed period of time, and wherein the scheduling condition is characterized as a non-usage event.

16. The system of claim 14, wherein the event is characterized as a scheduling condition associated with completion of a predetermined number of I/O data accesses by said system, and wherein the scheduling condition is characterized as a usage event.

17. The system of claim 14, wherein the event is characterized as a threshold event wherein an operating parameter has a value outside a predetermined threshold range, and wherein the scheduling condition is characterized as a usage event.

18. The system of claim 14, wherein the event is characterized as a threshold event wherein an operating parameter has a value outside a predetermined threshold range, and wherein the scheduling condition is characterized as a non-usage event.

19. The system of claim 14, wherein the parameter adjusted during the adjusting step comprises an available amount of write cache memory for storing data to be written to storage media of said system.

20. The system of claim 14 wherein the parameter adjusted by the at least one processor comprises an operational level of a disc array of said system.

21. The system of claim 14, wherein the at least one processor further copies a content of a first memory location to a second memory location in said system prior to executing said diagnostic routine.

22. The system of claim 14, wherein the content of the first memory location comprises user data arranged in a first format, and wherein the at least one processor further arranges said user data in a different second format in the second memory location.

23. The system of claim 14, wherein the content of the first memory location comprises the diagnostic routine executed by said at least one processor.

24. The system of claim 14, wherein a first processor from said at least one processor carries out said monitoring operation, and wherein a second processor from said at least one processor carries out said adjusting and executing operations.

25. The system of claim 14, wherein the at least one processor further performs a component adjustment in said system in response to a result obtained during the execution of the diagnostic routine.

26. The system of claim 25, wherein the performing and executing operations are sequentially repeated to arrive at a final component adjustment in said system.

27. The system of claim 14, wherein the at least one processor further copies a content of a first memory location to a second memory location in said system prior to the execution of the diagnostic routine, and restores the content to the first memory location after the execution of the diagnostic routine.

28. An apparatus comprising a distributed data storage system comprising a host system, a storage controller, a plurality of data storage devices, and first means for monitoring for an occurrence of an event associated with operation of a distributed data storage system, for characterizing the event as a usage event related to a usage rate of said system or a non-usage event not related to a usage rate of said system, for adjusting a parameter of the data storage system when the event is characterized as a usage event, and for executing a diagnostic routine when the event is characterized as a non-usage event.

29. The apparatus of claim 28, wherein the first means comprises at least one processor with associated programming code in a memory location.

* * * * *